(12) United States Patent
Begle et al.

(10) Patent No.: US 11,364,864 B2
(45) Date of Patent: Jun. 21, 2022

(54) GRILLE WITH INTEGRATED ENERGY MANAGEMENT SYSTEM

(71) Applicant: Ford Global Technologies, LLC, Dearborn, MI (US)

(72) Inventors: Kyle Begle, Walled Lake, MI (US); Ken Osuagwu, Farmington Hills, MI (US); Martin Lopez, Sterling Heights, MI (US); Michael Gutowski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

(21) Appl. No.: 16/752,455

(22) Filed: Jan. 24, 2020

(65) Prior Publication Data

US 2021/0229612 A1     Jul. 29, 2021

(51) Int. Cl.
*B60R 19/52* (2006.01)
*B60R 19/02* (2006.01)

(52) U.S. Cl.
CPC .............. *B60R 19/52* (2013.01); *B60R 19/02* (2013.01); *B60R 2019/527* (2013.01)

(58) Field of Classification Search
CPC .......................... B60R 19/52; B60R 2019/527
USPC ...................................... 293/115; 296/193.1
See application file for complete search history.

(56) References Cited

U.S. PATENT DOCUMENTS

| | | | |
|---|---|---|---|
| 6,848,730 B2 | 2/2005 | Evans | |
| 7,108,092 B2 | 9/2006 | Suwa et al. | |
| 9,475,441 B2 | 10/2016 | Calleja et al. | |
| 10,272,819 B2* | 4/2019 | Glickman | F21S 41/29 |
| 10,704,756 B2* | 7/2020 | Glickman | B60Q 1/2649 |
| 2017/0008474 A1* | 1/2017 | Wey | B60R 19/52 |
| 2018/0119304 A1* | 5/2018 | Kim | C25D 5/022 |
| 2019/0291672 A1 | 9/2019 | Tanioku et al. | |
| 2020/0055388 A1* | 2/2020 | Gerber | B60K 11/085 |

FOREIGN PATENT DOCUMENTS

EP     1433664 A2 *  6/2004
KR     10-1744911 B1   6/2017

\* cited by examiner

*Primary Examiner* — Jason S Morrow
(74) *Attorney, Agent, or Firm* — Vichit Chea (57) ABSTRACT

A system includes a vehicle body which further includes a front beam. The system also includes an energy absorber that may be coupled to the front-end beam of the vehicle body. In an example, the energy absorber includes a first edge and a second edge that may be opposite to the first edge along a first direction. The energy absorber also includes a first exterior surface that extends between the first edge and the second edges of the energy absorber. Further, the first exterior surface includes a plurality of openings therein. The system also includes a grille having a first edge and a second edge which may be opposite to the first edge of the grille. In one example, the second edge of the grille may be coupled to the first edge of the energy absorber. The grille includes a plurality of extensions that may extend from the second edge in such a way that the plurality of extensions are positioned in the plurality of openings in the energy absorber.

24 Claims, 8 Drawing Sheets

GRILLE WITH INTEGRATED ENERGY MANAGEMENT SYSTEM

BACKGROUND

Technical Field

The preset disclosure is directed to a grille having a plurality of extensions integrated with an energy management system.

Description of the Related Art

A front fascia or front end of a vehicle includes components, such as grilles, bumpers, and headlights that are coupled to a beam of the vehicle's chassis. The grille covers a front opening of the vehicle which allows air to move into interior components supported by the chassis, such as an air intake unit, a radiator unit, or an intercooler for example. The front fascia further includes an impact absorber mounted on the chassis in front of a bumper beam, such that the impact absorber protects the vehicle components in the event of a frontal collision. Typically, the grille is more prone to damage than the bumper in the event of the frontal collision. As a result, the front collision can cause the grille to break down.

One of the ways to mitigate the damage of the grille, and thereby the front end vehicle components, is to provide an energy absorber assembly. For instance, shock absorbers may be provided on a lower section of the grille that engage with the impact absorber mounted on the chassis to transmit the impact from the grille to the impact absorber.

BRIEF SUMMARY

The present disclosure relates to a grille having extensions that overlap with an integrated energy management system. The integrated energy management system is configured to mitigate a force of an impact from being transmitted through the grille into an engine compartment. The extensions extend from a lower surface of the grille and overlap with prongs or upward extensions of an energy absorber that is coupled to a beam of a chassis of the vehicle. The extensions of the grille are sized and shaped to integrate with the energy absorber and beam such that in the event of a low speed crash or collision, the extensions of the grill mitigate the damage to components in the engine compartment.

According to an embodiment of the present disclosure, the grille includes a first upper edge and a second lower edge, such that the first edge is opposite to the second edge. An air-flow portion having a plurality of openings is positioned between the first edge and the second edge. Further, the plurality of extensions are extending from the second edge. In one embodiment, each extensions has a somewhat hollow shape formed from a first wall, a second wall, and a third wall. While the first wall and the second wall extend from the second edge, the third wall extends between the first wall and the second wall at a location spaced from the second edge. In one example, the third wall is transverse to the first wall and the second wall. When assembled, the third wall will be positioned between adjacent portions of the energy absorber.

Another embodiment of the present disclosure relates to a system that includes a vehicle body having a front beam, an energy absorber coupled to the front beam, and a grille coupled to the energy absorber. In this embodiment, the energy absorber includes a first upper edge and a second lower edge opposite to the first edge along a first direction. The energy absorber further includes a first exterior surface extending between the first edge and the second edge. The first exterior surface includes a plurality of openings that separate adjacent portions of the energy absorber. Similar to the energy absorber, the grille also has a first edge and a second edge such that the first edge is positioned opposite to the second edge along the first direction. The grille further includes a plurality of extensions extending from the second edge. In this embodiment, the second edge of the grille is placed adjacent to the first edge of the energy absorber such that the plurality of extensions are positioned in the plurality of openings of the energy absorber.

Yet another embodiment of the present disclosure relates to a grille including a lower curved edge and an upper edge spaced from the lower curved edge. The grille further includes a barrier extending between the upper and the lower curved edge, where the barrier includes a plurality of openings. The grille further includes a plurality of protrusions extending from the lower curved edge.

According to an example, the energy absorber extends in such a way that the energy absorber is impacted first in a collision. Then the grille comes into contact with an object with which the frontal collision occurs. This may minimize damage to the interior components and limit the damage to the grille. Moreover, the grille is designed to minimize the force transferred from the energy absorber and the grille to the vehicle's chassis, which minimizes damage. The grille of the present disclosure, including the plurality of extensions can be formed as a single item in a molding process. This grill can be integrated with existing energy absorbers, which makes the vehicle more robust and simpler to manufacture.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

Figure 1:
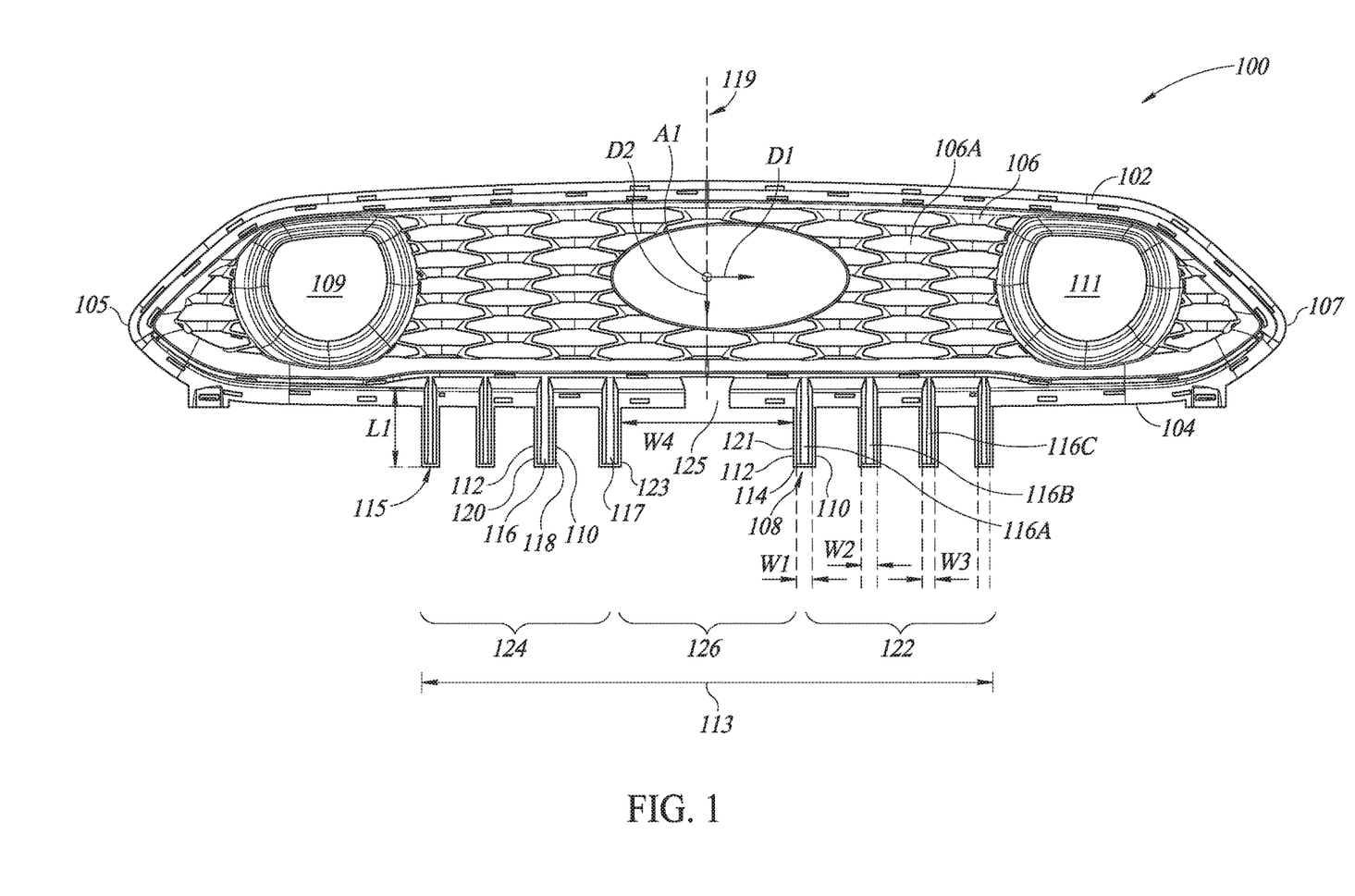
FIG. 1 is a front view of a grille having extensions according to an embodiment of the present disclosure.
Figure 4:
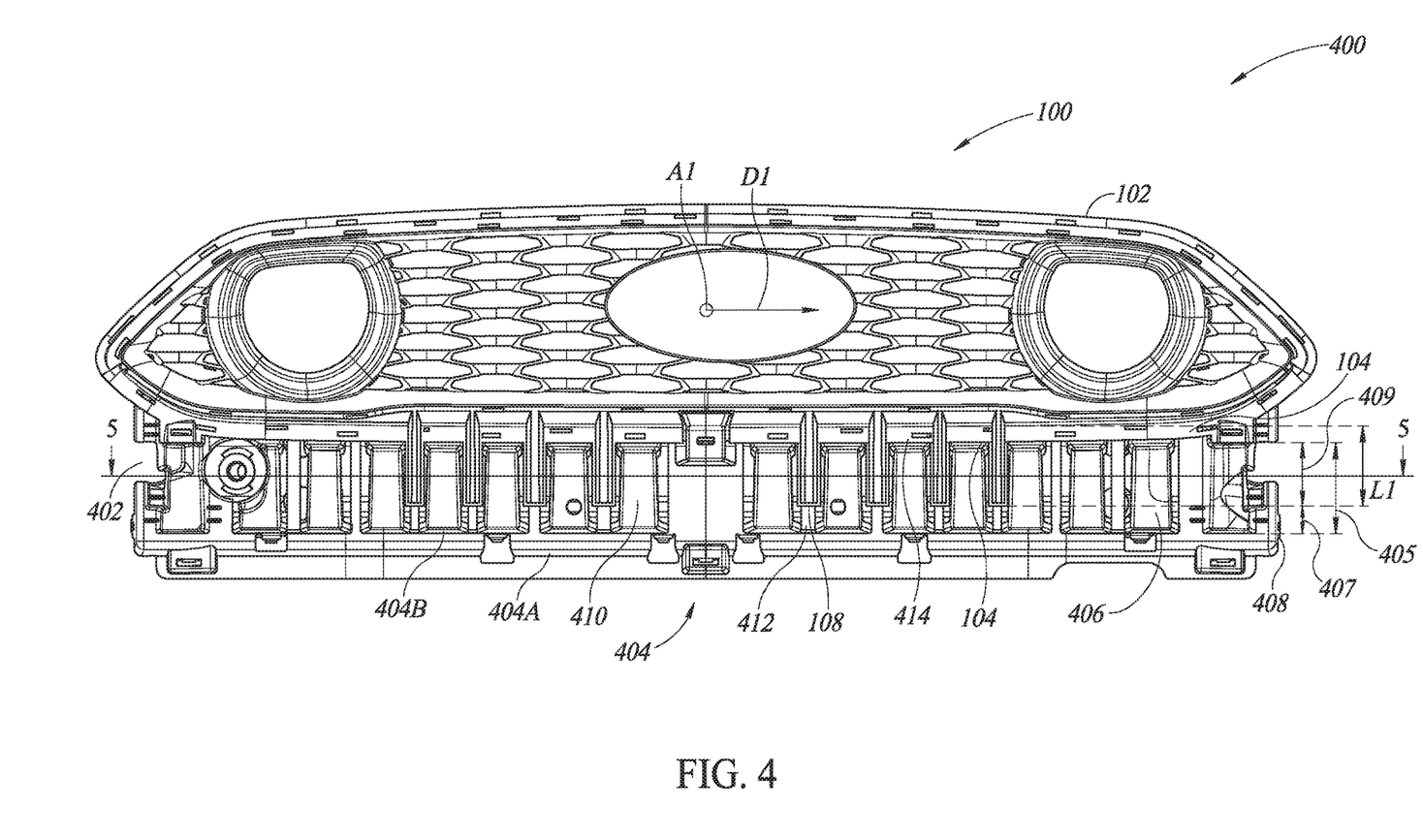
FIG. 4 is a front view of the grille of FIG. 1 integrated with an energy absorber according to an embodiment of the present disclosure.

FIG. 1 is a front view of a grille 100 according to an embodiment of the present disclosure. While not shown explicitly, the grille 100 covers an opening in a front portion of a vehicle that allows air to move into an interior portion of the vehicle, such as an engine compartment. The grille 100 is integrated with a bumper assembly, including an energy absorber at a front end of the vehicle (as shown in FIG. 4).

The grille 100 includes a first edge 102 and a second edge 104 that may define boundaries of the grille 100. The first edge 102 couples to the second edge 104 at a first location 105 and a second location 107. The first edge 102 will be closer to a hood of the vehicle and the second edge will be positioned or integrated with a bumper of the vehicle. The first edge and the second edge have a contour that aligns with shapes of the hood and bumper of the associated vehicle.

The grille 100 includes an air-flow portion 106 positioned between the first edge 102 and the second edge 104. A first opening 109 and a second opening 111 may be provided between the first edge 102 and the second edge 104. The first and second openings may be for headlights. The plurality of extensions are positioned between the first opening 109 and the second opening 111. The air-flow portion 106 is positioned between the first and second openings. The air-flow portion 106 is mounted in front of the engine compartment, such that the air-flow portion 106 directs the air towards the engine compartment. To accomplish this, the air-flow portion 106 includes a plurality of openings 106A that allow the air to pass through and dissipate heat from internal components, such as an engine radiator. In an example, the air-flow portion 106 may have a honeycomb mesh to direct the airflow. In another example, the air-flow portion 106 may include a plurality of horizontally placed slats that run along width of the air-flow portion 106. In addition, based on the vehicle design, the air-flow portion 106 may accommodate an emblem of the manufacturer.

The plurality of extensions 108 extend from the second edge 104. These extensions 108 extend downward towards the ground. In the illustrated example, there are eight extensions of the plurality of extensions 108. The extensions are extending from a portion 113 of the second edge 104. This portion 113 is a central portion that is aligned with a center of the vehicle. However, it should be noted that there may be fewer or more extensions and that the extensions 108 may extend along a larger portion of the second edge 104.

In one embodiment, each extension 108 includes a first wall 110, a second wall 112, and a third wall 114. The first wall 110 and the second wall 112 are coupled to and extend from the second edge 104 and the third wall 114 extends transverse between the first wall 110 and the second wall 112 in a manner that the two walls 110, 112 are joined at a base 115. The base 115 is spaced from the second edge 104 by a distance. The base is the furthest point of the extension from the second edge 104.

In the illustrated example, the first wall 110, the second wall 112, and the third wall 114 form an opening 116. An interior-most surface of the opening 116 is a fourth wall 117. The fourth wall 117 is coupled to the first wall 110 on a first side and to the second wall 112 on a second side. The fourth wall 117 extends from the second surface 104 toward the base 115. The fourth wall 117 is also coupled to the base. There are as many openings 116 as the number of extensions 108 in the grille 100. Further, although the current illustration shows eight extensions 108 and eight openings 116, the grille 100 may include any number of extensions 108 and openings 116.

Each opening 116 has a first side 118 that corresponds to the first wall 110 and a second side 120 that corresponds to the second wall 112. In other words, the first wall 110 forms as a part of and extends from the first side 118 while the second wall 112 is formed as a part of and extends from the second side 120, thereby making the structure integrated. The extensions and the grill can be made in a single injection molding process.

In one example, when viewed from a top-down perspective, the openings 116 may have a truncated cross section, such that width of front of the opening 116 is wider than width of rear of the opening 116. In another example, the openings 116 may have different cross-sections, such as rectangular, conical, or hemi-spherical.

In one example, a first subset 122 of the plurality of extensions 108 is spaced from a second subset 124 of the plurality of extensions 108, such that the first subset 122 and the second subset 124 are on either side of a center line 119 through central axis A1 (shown into the page) of the grille 100. In one example, the first subset 122 is on a first side of the central axis A1 while the second subset 124 is on a second side of the central axis A1. The number of extensions in the first subset 122 is equal to the number of extensions in the second subset 124. In addition, the first subset 122 and the second subset 124 separated by a central opening 126 that is the space between an innermost extension 121 of the first subset and an innermost extension 123 of the second subset. A size of the central opening 126 depends on the design of the grille 100. Further, as may be understood, a wider central opening 126 may also reduce an amount of material used to manufacture the grille 100, thereby reducing the manufacturing cost.

The second surface 104 includes an opening 125 that is aligned with the center line and is aligned with the central opening 126. The opening 125 has a smaller dimension in a first direction than the central opening 126 has in the first direction. The first direction being noted by D1 in FIG. 1. This opening 125 is optional based on the design of the grille and bumper assembly. A dimension between the first edge and the second edge in a second direction D2 that is transverse to D1 is greater than the dimension of the central opening 126 in the first direction. A plurality of additional openings are provided throughout the first and second edges of the grille and are to accommodate various attachment features for coupling the grille to other components of the bumper assembly and vehicle.

The extensions 108 are sized and shaped to transfer impact and mitigate the impacts from a low speed front end collision. A width of the openings 116 for each extension may vary from the central axis A1 towards the ends at locations 105, 107 of the grille 100 along a first direction D1. For instance, a first width W1 of a first opening 116A along may be greater than a second width W2 of a second opening 116B. Similarly, the second width W2 of the second opening 116B may be greater than a third width W3 of a third opening 116C. Such a provision provides larger gaps between the consecutive extensions 108 that are nearer to the central axis than between those further away from the central axis A1. The decreasing dimension of the widths of the extensions from the central line towards the exterior-most locations 105, 107 may relate to a curvature of the front end of the associated vehicle. In some embodiments, each of the widths of the extensions may be the same or substantially the same.

Moreover, the extensions 108 are sized such that each extension 108 may have a first length L1 in a second direction D2 transverse to the first direction D1, and the first length L1 may be greater than the first width W1 of the first opening 116A. The central opening has a fourth width W4 in the first direction D1 and the fourth width W4 is greater than the first width W1. Additional structural details of the extensions 108 and openings 116 are provided with respect to FIG. 2.

Those skilled in the art would appreciate that the grille 100 may be formed using one or more materials that can impart sufficiently high impact strength to the grille structure. In one embodiment, the grille, the extensions, edges of the openings, and the air-flow portion are all formed at the same time during an injection molding process. In addition, it should be noted that the grille 100 may be formed as an integral structure, where both the air-flow portion 106 and the extensions 108 may be coupled to the grille 100 using conventional techniques, such as molding, or the like. Alternatively, the air-flow portion 106 and the extensions 108 may be manufactured separately and can be coupled to the grille 100 using well known fastening means, such as but not limited to, nuts and bolts, screws, snap lock mechanism, plastic welding, or the like.

Figure 2:
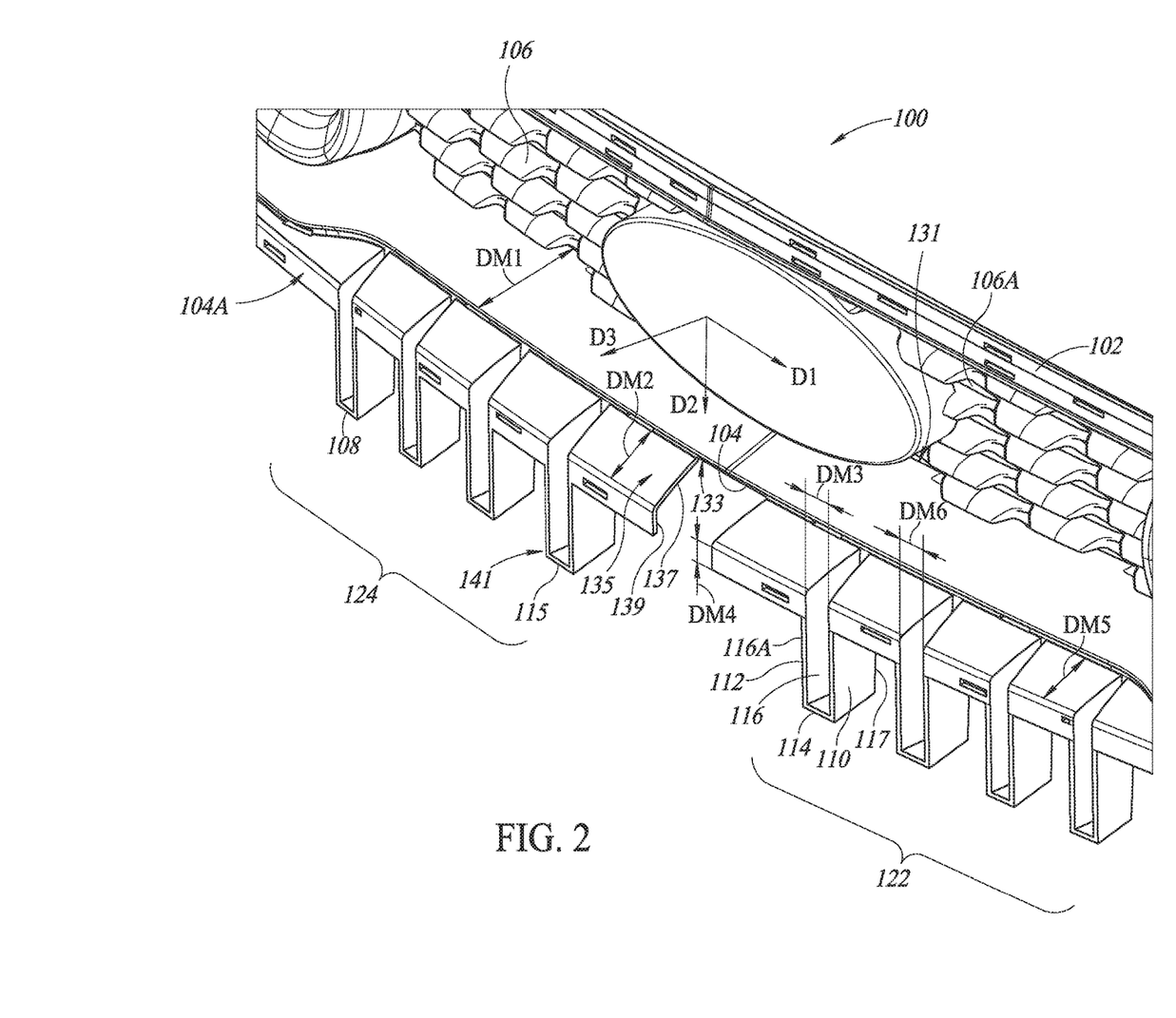
FIG. 2 is an enhanced perspective view of ones of the extensions of FIG. 1.

FIG. 2 is a perspective view of 100 an enhanced perspective view of ones of the extensions of FIG. 1, in accordance with one embodiment of the present disclosure. The grille 100 includes the lower curved edge 104 and the upper edge 102 that may be spaced from the lower curved edge 104 along the second direction D2 as shown in FIG. 2. In addition, the lower curved edge 104 includes an exterior most surface 104A. The exterior most surface 104A is spaced from an interior most surface 131 of the lower curved edge 104 by a dimension in a third direction D3.

As may be understood, the second direction D2 is transverse or perpendicular with respect to the first direction D1 and the third direction D3 is transverse or perpendicular to both D1 and D2. The grille 100 further includes the air flow portion, which may be a barrier 106 that extends between the upper edge 102 and the lower curved edge 104. The barrier 106 has a plurality of openings 106A. In the illustrated example, the barrier 106 may be coupled in such a way that the barrier 106 is spaced from a surface 133 along the third direction D3 by a first dimension DM1. More specifically, a barrier 106 is positioned relatively behind or interior to the exterior-most surface 104A. The first dimension DM1 may be chosen based on parameters, such as the design of the grille, overall dimension of the vehicle, or the like. Although the present illustration shows the barrier 106 being spaced from the exterior-most surface 104A, the barrier 106 may be flushed with the exterior-most surface 104A or the surface 133.

In an example, the grille 100 also includes the plurality of protrusions 108 that extend from the lower curved edge 104 in the first direction D1. Moreover, like the extrusions 108 (as shown in FIG. 1), the protrusions 108 have walls and each wall may have a second dimension DM2 along the second direction D2 that may be less than the first dimension DM1. The second dimension DM2 extends between the surface 133 and the exterior-most surface 104A. The second dimension corresponds to a surface 135 of a wall 137 that is angled with respect to an axis aligned with the third direction D3. This surface 135 may be planar or a may be curved from the connection with the surface 133 to the exterior-most surface 104A. The wall is angled toward the ground or toward the base or end 115.

Another wall 139 is transverse to and coupled to the wall 137. A fourth dimension DM4 of the wall 139 is less than the second dimension DM2. Each protrusion 108 extends from a first portion of the wall 139 and a second portion of the wall 139. In the illustrated example, each of the protrusions 108 includes the first wall 110 and a second wall 112 that extend from the wall 137. When viewed from the front side of the vehicle, the walls 110, 112 extend downward towards the ground. Further, the first wall 110 and the second wall 112 are separated by the third wall 114. The third wall has a third dimension DM3 along the first direction D1. More specifically, the base 115 couples the first wall 110 to the second wall 112. In some embodiments, an opening 116 is formed, which has the third dimension DM3. Accordingly, each protrusion 108 may have the opening 116 whose width corresponds with the third dimension DM3 of that respective protrusion. In one example, the openings 116 may have a truncated cross-section, such as a frustum shaped cross-section formed by a fourth wall 117. In other examples, the fourth wall may be omitted such that the first wall and the second wall are coupled together at an interior-most location. In other examples, the opening 116 may have any suitable cross-section, such as rectangular, triangular, or the like, based on the design of grille 100. According to an example, some of the openings 116 are the first subset 122 of protrusions and the remainder are the second subset 124, along either side of the central opening (126, as shown in FIG. 1). The openings 126 have the second dimension DM2, which extends from the fourth wall 117 to an exterior most surface 141 of each protrusion 108. The exterior most surface 104A of the grille curves toward the beam of the vehicle or toward the engine compartment. As such, in some embodiments, a first opening 116A (an opening adjacent to the central opening) in the first subset 122 along the direction D1 may have a greater dimension, DM3 than a dimension DM6 of a second opening (an opening adjacent to the first opening) along the direction D1. As may be understood, the first opening is closer to the central opening (126, as shown in FIG. 1) than the second opening. A fifth dimension DM5, which corresponds to the wall 137 and is spaced from the central opening 126 may be less than the second dimension DM2, based on the curvature of the exterior most surface.

Figure 3:
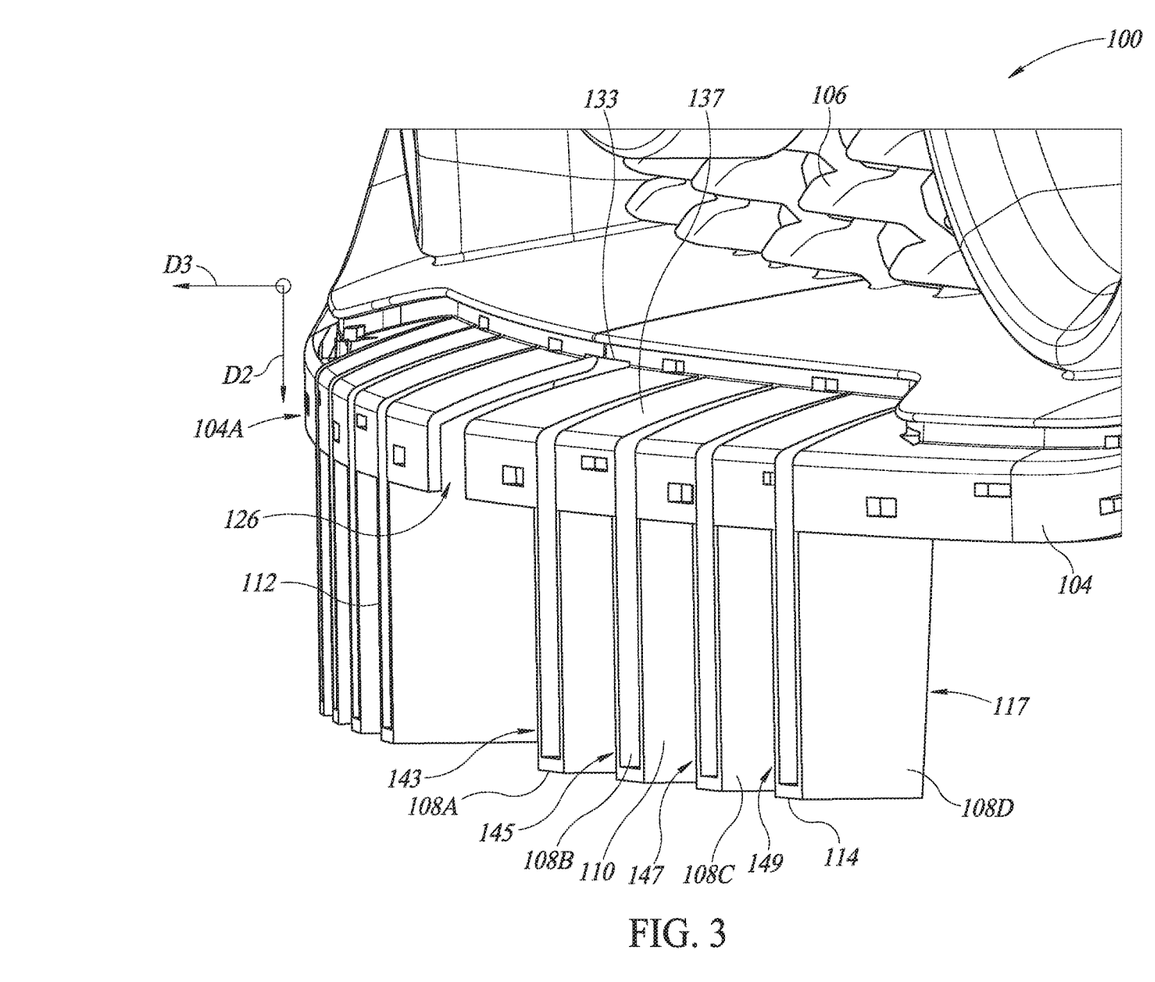
FIG. 3 is an enhanced side view of ones of the extensions of FIG. 1.

FIG. 3 illustrates a side view of the grille 100, in accordance with one embodiment of the present disclosure. In the illustrated embodiment, a first protrusion 108A extending from the lower curved edge 104 is adjacent to the central opening 126. A second protrusion 108B is spaced from the central opening 126 by the first protrusion 108A. A third protrusion 108C is spaced from the first protrusion by the second protrusion and a fourth protrusion 108D is spaced from the second protrusion by the third protrusion. The exterior most surface 104A of the lower edge 104 extends further from the air flow portion 106 than an outermost surface 143 of the first protrusion 108A, an outermost surface 145 of the second protrusion 108B, an outermost surface 147 of the third protrusion 108C, and an outermost surface 149 of the fourth protrusion 108D. The exterior most surface curves from the left side of the illustration toward the right side of the illustration, which corresponds to the engine side of the grille.

The fourth wall 117 is transverse to the wall 137. The base 115 is transverse to the fourth wall, or interior most wall 117. The arrangement of the fourth wall is to accommodate a surface of the beam of the chassis, which is discussed in more detail below. Such a design ensures better dissemination of the impact in an event of frontal collision. Each of the protrusions extend an equal distance or substantially equal distance from the wall 137. In other embodiments, different protrusions may extend different distances from the wall 137.

According to the present disclosure, the grille 100 is designed to facilitate an operation of an energy absorber that transmits a force of impact to the vehicle's chassis. For instance, the grille 100 may prevent any unwanted buckling of the energy absorber that the energy absorber typically undergoes during the frontal collision. When the grille with extensions is impacted or the bumper positioned between the extensions and the external environment is impacted, the load or force of the impact may be transferred into the grille. This is due in part to the integrated manufacturing of the grille and the extensions, such as by injection molding. Accordingly, the grille 100 can be used with the energy absorber to receive and disseminate the force in the event of impact. An exemplary system that shows this combination of grille and energy absorber is explained with respect to FIGS. 4 and 5. The shape and arrangement of the protrusions or fins causes the energy management system to collapse less when impacted in a low speed collision. The interior fourth wall interacts with the beam to soften or less the impact of the collision and minimize the damage to the energy absorber, beam, and other engine components. In some embodiments, the surfaces of the protrusions may be textured, such as corrugation or ribbing to change flexion and reaction during a crash.

Figure 5:
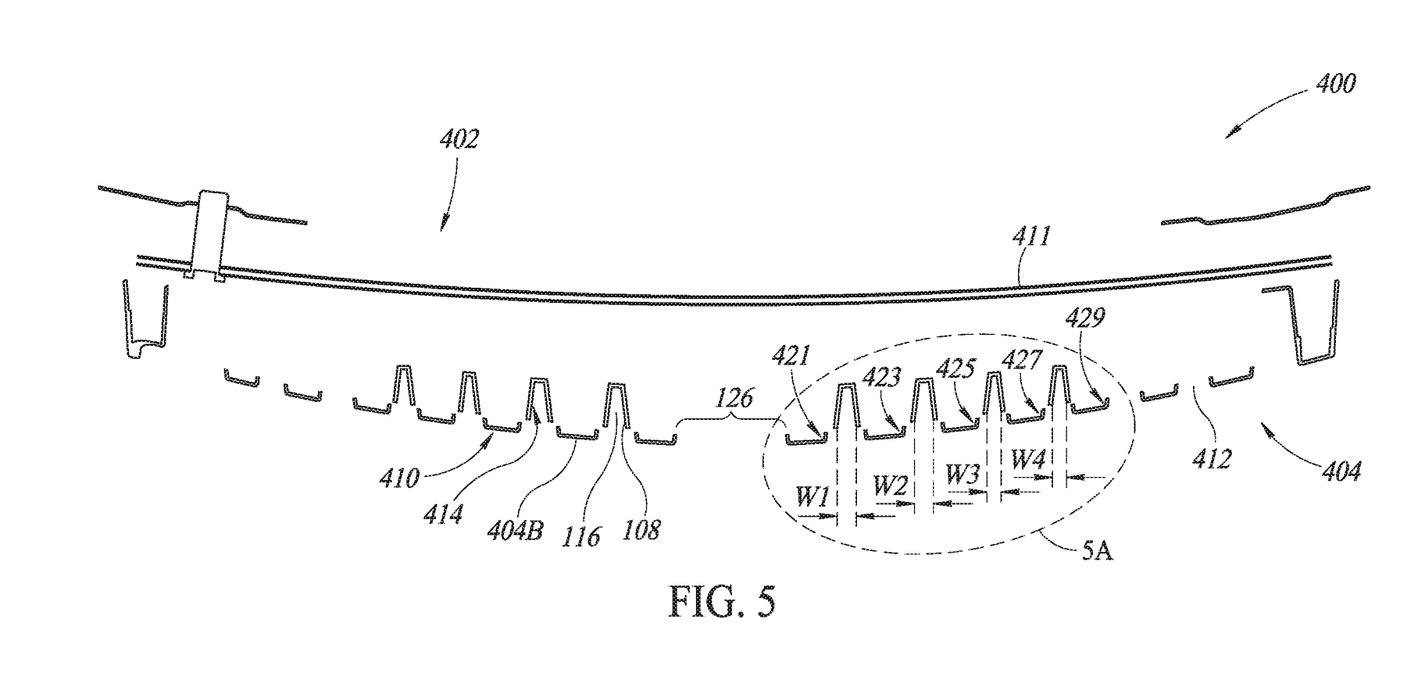
FIG. 5 is a cross-sectional view taken along lines 5-5 of FIG. 4.

FIGS. 4 and 5 illustrate a system 400 that may be a part of a vehicle, in accordance with one embodiment of the present disclosure. FIG. 4 is a front view of the system 400. FIG. 5 is a cross-sectional view of the system along cut lines 5-5 of FIG. 4. The system 400 includes a front-end beam 402 of the vehicle chassis. The system 400 also includes an energy absorber 404 that includes a base 404A coupled to the front-end beam 402 by various means, such as fasteners, screws, pegs, snaps or other suitable techniques.

The energy absorber 404, in operation, is configured to absorb an impact received by the system 400. Many energy absorbers are designed to collapse or crumple on impact to minimize impact to the front-end beam. The energy absorber may also transmit some of the impact to the front-end beam 402. The energy absorber 404 includes a first edge 406 and a second edge 408 that may be opposite to the first edge 406. The first edge is an upper edge and the second edge is a lower edge. The energy absorber 404 also includes a plurality of exterior surfaces 410. In addition, the first exterior surface 410 of the energy absorber 404 includes a plurality of openings 412 that are spread across a width of the energy absorber 404. Further, the openings 412 divide the exterior surface into the plurality of exterior surfaces of the energy absorber 404. There are physical segments, portions or lobes 404B of the energy absorber. The plurality of lobes 404B are separated from each other by one of the openings 412.

The grille 100 with the plurality of extensions 108 from FIG. 1 is integrated with and coupled to the energy absorber 404. In the illustrated example, the grille 100 may be coupled to the energy absorber 404, such that the first edge 406 of the energy absorber 404 may be coupled to the second edge 104 of the grille 100. Further, the first edge 406 of the energy absorber 404 is coupled to the second edge 104 of the grille 100 in a manner such that the extensions 108 of the grille 100 extend into the openings 412 of the energy absorber 404. Those skilled in the art would appreciate that such combination of extensions 108 and openings 412 may create any suitable configuration, such as interlocked structure, snap-fit configuration, or the like. It should be noted that the extensions 108 may minimize and mitigate buckling or collapsing of the lobes 404B when the lobes 404B deform during a collision. Moreover, the lobes 404B may deform parallel along the central axis A1, which reduces potential damage.

There is dimension or distance 405 between the first edge 406 and the second edge 408 of the energy absorber. The base 115 of the extensions 108 is positioned between the first edge 406 and the second edge 408 when assembled. A distance 407 between the base 115 and the second edge 408 is less than the dimension 405. A distance 409 between the base 115 and the first edge 406 is greater than the distance 407.

The energy absorber may have more openings 412 than there are extensions 108. For example, as can be seen in FIG. 5, the outermost openings 412 do not correspond to an extension. There are seven openings on each side of the central opening 126. The extensions of the first set and the second set are mirror images of each other in that the interior most extensions are similarly sized and shaped to each other.

As mentioned before, the extensions 108 may also have openings 116 and a first interior surface 414. The dimensions from W1 to W4 become progressively smaller. Dimensions of the corresponding openings 412 may also become progressively smaller as the openings are further from the central opening 126. The outer most surfaces 143, 145, 147, and 149 are all positioned closer to a beam surface 411 than an interior most surface 421, 423, 425, 427, and 429 of the lobes of the energy absorber 404. Moreover, as shown in FIG. 5, the extensions 108 and the lobes 404B are designed in such a way that a gap between the first exterior surface 410 and the first exterior surface 414 varies along either side of the central point 126. For instance, a gap G1 may be larger than a gap G2. Similarly, the next gap G3 may be smaller than the gap G2 and the gap G4 may be smaller than the gap G3. Such a provision allows the grille 100 and the energy absorber 404 to assume a curved profile. In the illustrated example, the extensions 108 and the lobes 404B are positioned in such a way that during the impact neither the extensions 108 nor the lobes 404B bend, thereby minimizing damage to the beam. The structural details of the extensions 108 that result in such a property are explained with respect to FIGS. 6 and 7.

Figure 6:
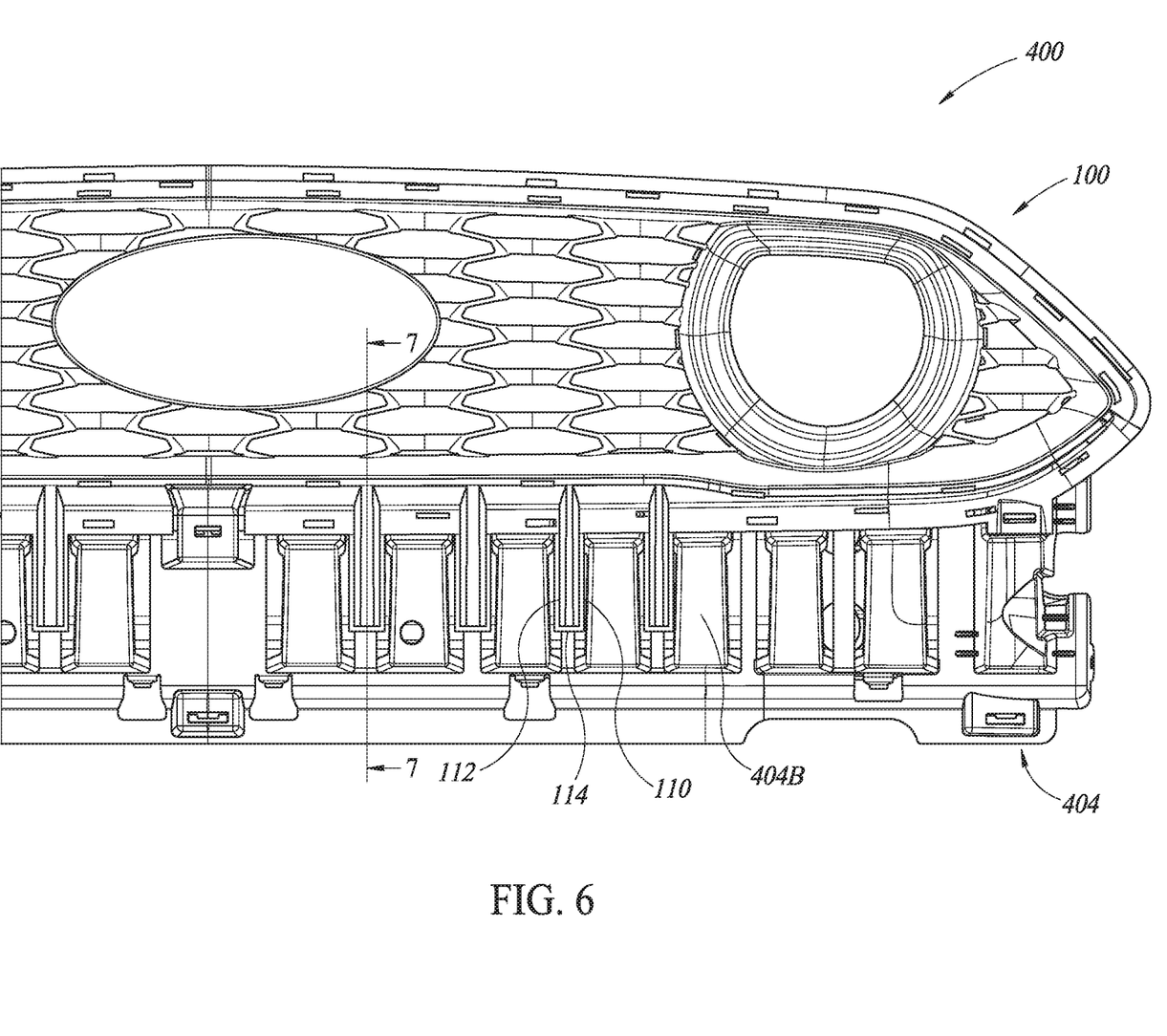
FIG. 6 is an enhanced front view of the grille and energy absorber of FIG. 4.
Figure 7:
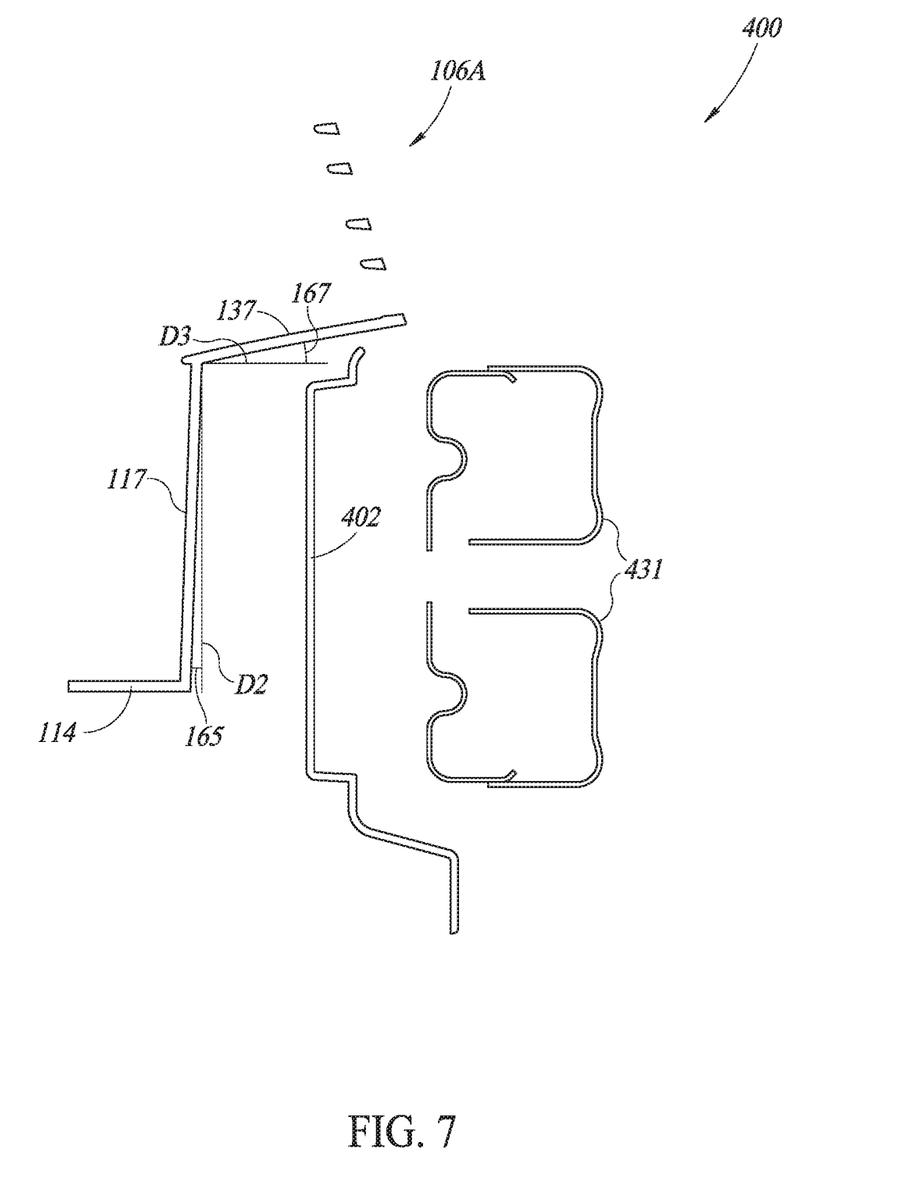
FIG. 7 is a cross-sectional view taken along the lines 7-7 of FIG. 6.

FIG. 6 illustrates an enhanced view of the system 400, in accordance with one embodiment of the present disclosure, while FIG. 7 shows a cross-sectional view along cut lines 7-7 of FIG. 6. As shown in FIG. 6, the extensions 108 are interposed between consecutive lobes 404B. The fourth wall 117 that extends between the first wall 110 and the second wall 112 and is transverse to the first wall 110 and the second wall 112 is in FIG. 7. The fourth wall 117 is substantially parallel with the front-end beam 402. However, it is noted that the fourth wall 117 may be at a slight angle 165 with respect to the front end beam. The angle 165 is illustrated with respect to the second direction D2 and may be 15 degrees or less. The wall 137 that connects the fourth wall 117 with air flow portion 106A may be inclined with respect to the ground. An angle 167 with respect to the third direction D3 is greater than the angle 165, but remains less than 45 degrees and is likely less than 30 degrees. During the frontal collision, the wall 137 may bend to allow the fourth wall 117 to remain parallel and abut the front-end beam 402. The extensions may prevent damage from occurring with beam components 431 during a low speed collision.

Figure 8:
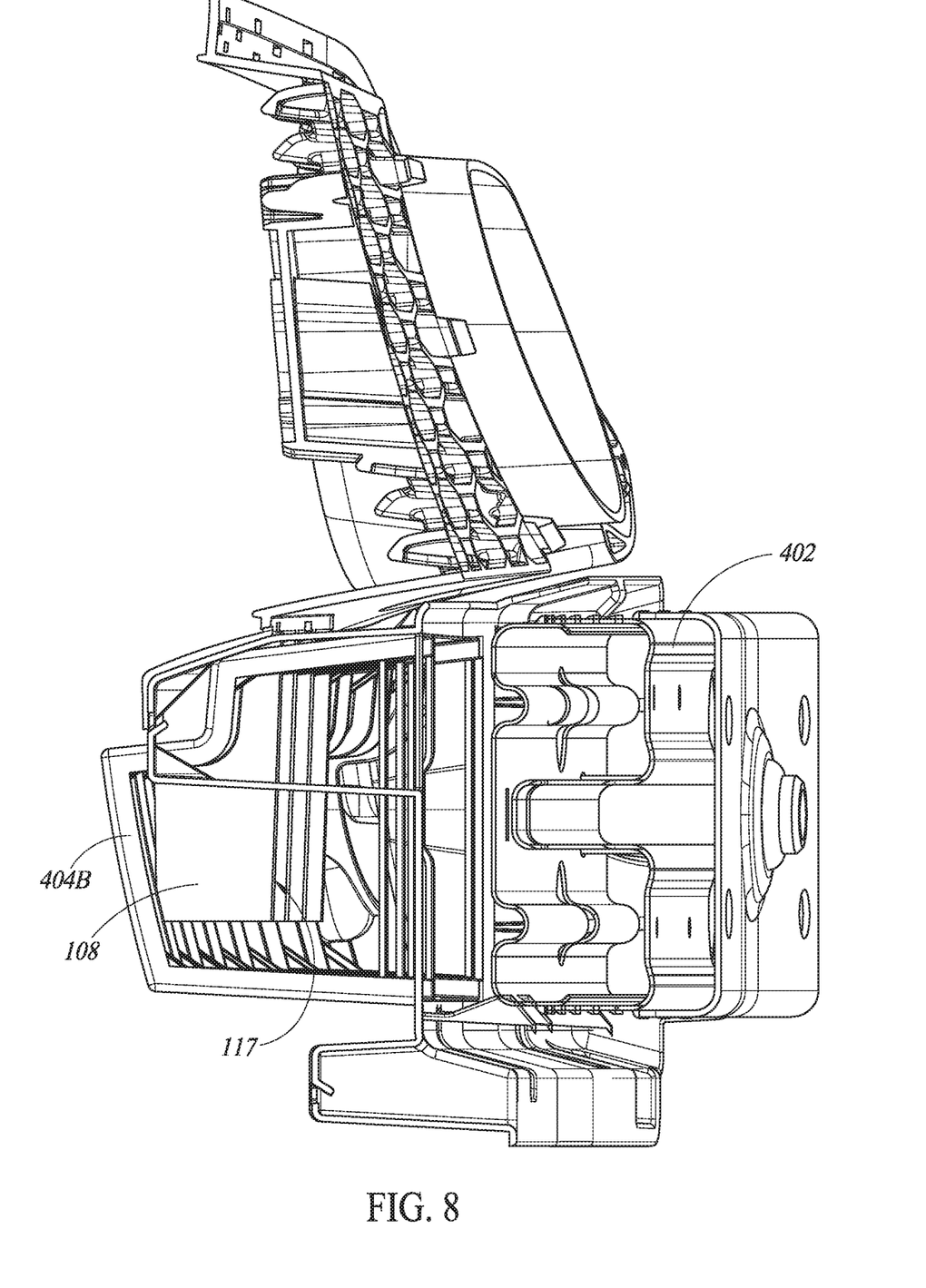
FIG. 8 illustrates an enhanced, cross-sectional side view of the grille and a beam of a vehicle according to an embodiment of the present disclosure.

FIG. 8 is a cross-sectional side view of the system in accordance with one embodiment of the present disclosure. When the front end of the vehicle hits an object, such as a barrier or a rear end of another vehicle ahead, the lobes 404B receive the force generated by the contact between an object and the front end. The impact compresses the lobes 404B. Further, in order to facilitate the compression, the extensions 108 restrict buckling of the lobes 404B, thereby allowing the lobes 404B to compress along the central axis A1. Further, as the lobes 404B compress, the lobes 404B absorb the force and transmit the force to the base 404A of the energy absorber 404. Thereafter, the base 404A dissipates the force to the front-end beam 402. Further, in a case where the impact causes the lobes 404B to compress to their maximum compression, and the object to make contact with the extensions 108, the impact received by the extensions 108 will be significantly less than would otherwise be the case if the grille 100 had received the impact in the first place. Moreover, the extensions 108 deform along the central axis A1 in such a way that the fourth wall 117 remains parallel or otherwise abuts the front-end beam 402.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A grille, comprising:
a first edge opposite to a second edge;
an air-flow portion having a plurality of openings, the air-flow portion being between the first edge and the second edge;
a plurality of extensions that extend from the second edge, each of the plurality of extensions including:
a first wall that extends from the second edge;
a second wall the extends from the second edge; and
a third wall that extends between the first wall and the second wall, wherein the second edge includes a plurality of openings, and each opening has a first side that corresponds to the first wall and a second side that corresponds to the second wall.

2. The grille of claim 1 wherein the third wall is transverse to the first wall and the second wall.

3. The grille of claim 1 wherein the first wall of each of the plurality of extensions is coupled to and extends from the first side and the second wall of each of the plurality of extensions is coupled to and extends from the second side.

4. The grille of claim 1 wherein each opening of the plurality of openings has a truncated cross-section.

5. The grille of claim 4 wherein a first subset of the plurality of openings is on a first side of a central axis of the second edge and a second subset of the plurality of openings is on a second side of the central axis of the second edge.

6. The grille of claim 5 wherein the first subset has a same number of openings as the second subset.

7. The grille of claim 5 wherein a first opening of the first subset has a first width in a first direction and a second opening of the first subset has a second width in the first direction, the first width being greater than the second width.

8. The grille of claim 7 wherein a third opening of the first subset has a third width in the first direction, the second width being greater than the third width.

9. The grille of claim 8 wherein the second edge includes a central opening, the first subset being separated from the second subset by the central opening.

10. The grille of claim 9 wherein the central opening has a fourth width in the first direction and the fourth width is greater than the first width.

11. The grille of claim 10 wherein each of the plurality of extensions includes a first length in a second direction that is transverse to the first direction, the first length being greater than the first width.

12. A system, comprising:
a vehicle body having a front-end beam; and
an energy absorber coupled to the front-end beam of the vehicle body, the energy absorber having:
a first edge and a second edge that is opposite to the first edge along a first direction;
a first exterior surface that extends between a first side and a second side;
a plurality of openings in the first exterior surface; and
a grille coupled to the energy absorber, the grille having:
a first edge and a second edge that is opposite to the first edge along the first direction, the second edge of the grille being adjacent to the first edge of the energy absorber; and
a plurality of extensions that extend from the second edge and are positioned in ones of the openings of the energy absorber.

13. The system of claim 12 wherein each extension of the plurality of extensions includes a first exterior surface, the first exterior surface of the energy absorber being further from the front-end beam in a second direction that is transverse to the first direction than the first exterior surface of each extension.

14. The system of claim 13 wherein each extension of the plurality of extensions includes:
a second exterior surface;
a first wall;
a second wall; and
a third wall that extends between the second wall and the first wall.

15. The system of claim 14 wherein each extension of the plurality of extensions includes a fourth wall that extends between the first wall and the second wall, the fourth wall being transverse to the first wall and the second wall, the third wall being transverse to the first wall and the second wall and the fourth wall.

16. The system of claim 15 wherein the first wall and the second wall are transverse to the second edge of the grille.

17. A system, comprising:
a grille having:
a lower curved edge having an exterior-most surface;
an upper edge spaced from the lower curved edge in a first direction;
a barrier that extends between the upper edge and the lower curved edge, the barrier including a plurality of openings, the barrier being coupled to the lower curved edge at a location that is spaced from the exterior-most surface by a first dimension and a second direction that is transverse to the first direction; and
a plurality of protrusions that extend from the lower curved edge at the exterior-most surface in the first direction.

18. The system of claim 17 wherein the plurality of protrusions have walls that extend from the lower curved edge away from the upper edge.

19. The system of claim 18 wherein the walls have a second dimension in the second direction that is less than the first dimension.

20. The system of claim 19 wherein each protrusion includes a first wall and a second wall separated by a third dimension.

21. The system of claim 17 wherein the grille includes a central axis and each protrusion includes a first wall and a second wall that extends from the lower curved edge.

22. The system of claim 21 wherein a first subset of the plurality of protrusions is spaced from a second subset of the plurality of protrusions by the central axis.

23. The system of claim 22 wherein a first opening of the first subset has a second dimension between the first wall and the second wall in a third direction that is transverse to the first direction and the second direction and a second opening of the first subset has a third dimension between the first wall and the second wall in the third direction, the second dimension being greater than the third dimension.

24. The system of claim 23 wherein the first opening is closer to the central axis than the second opening.

* * * * *